Dec. 15, 1959 A. KOLTVEDT 2,916,783
COMBINATION AWNING SHUTTER
Filed Nov. 6, 1957 2 Sheets-Sheet 2
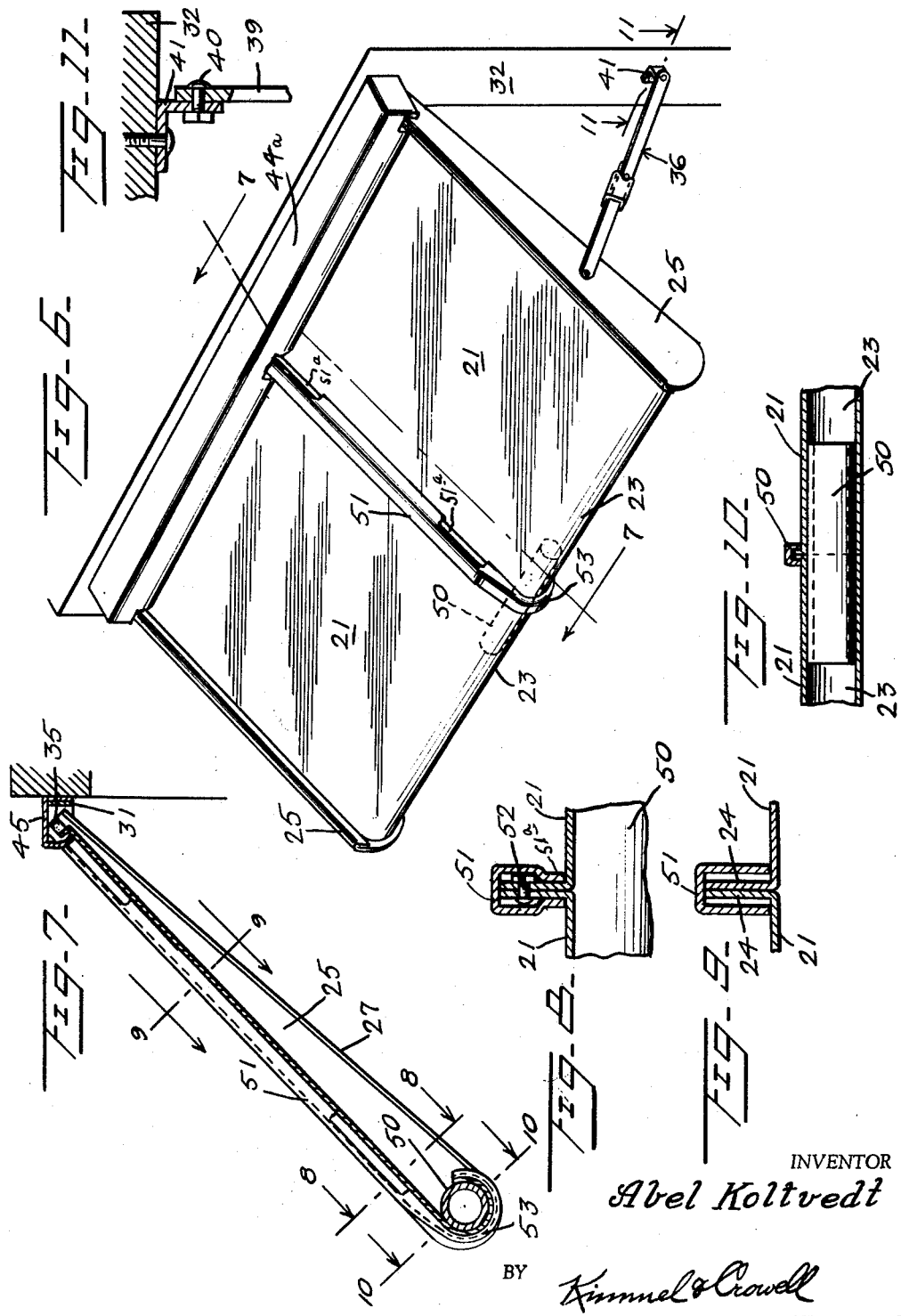
INVENTOR
Abel Koltvedt
BY
Kimmel & Crowell
ATTORNEYS

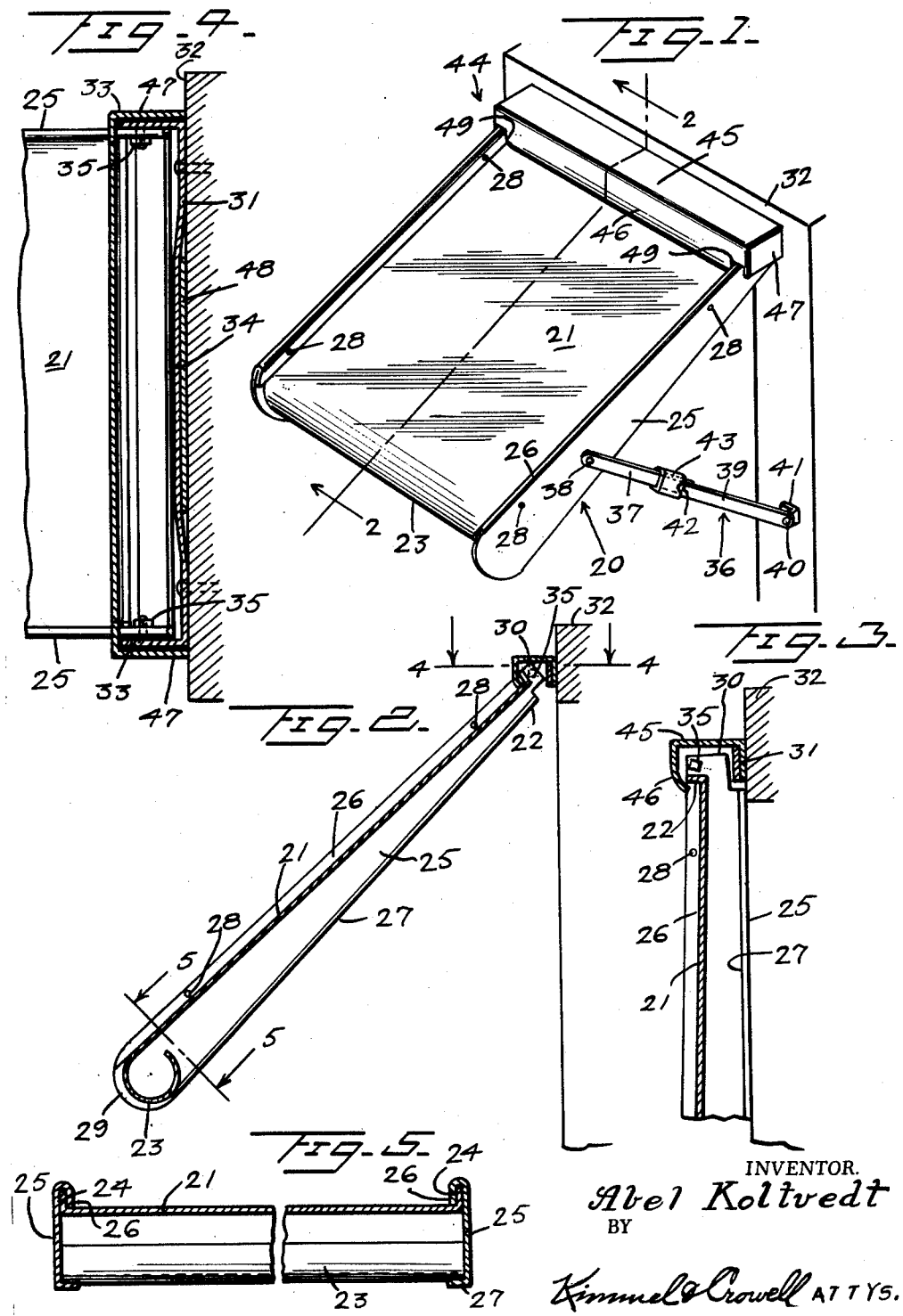

United States Patent Office 2,916,783
Patented Dec. 15, 1959

2,916,783

COMBINATION AWNING SHUTTER

Abel Koltvedt, St. Augustine, Fla.

Application November 6, 1957, Serial No. 694,872

1 Claim. (Cl. 20—57.5)

The present invention relates to a combination awning and shutter, more especially an article of this kind which can be made up of pre-fabricated sections requiring a very minimum of bolts, nuts, or the like fastenings, for assembly.

Objects of the invention are to provide a combination awning and shutter so constructed that whether in the raised awning position or in the lowered shutter position, it is weathertight against its support on the face of the building to which it is attached.

Further objects are to provide a combination awning and shutter which can easily be erected in sections to cover one or more windows or building openings at the same time and have the appearance of a single awning or shutter.

Another object is to provide a combination awning and shutter which when in the lowered position against the face of the window frame or other portion of a building will lie flat at its side portions, against the frame and make a weathertight closure My invention also provides a shutter to safeguard against storms, inclement weather and unauthorized entry.

The invention may be used as an awning shutter over windows, porches, or other openings of a building.

The invention includes novel means whereby the awning shutter may be composed of a number of adjacent sections.

Other objects and advantages will become apparent in the following specification when considered in light of the attached drawings, in which:

Figure 1 is a perspective view of the invention shown in erected position.

Figure 2 is an enlarged fragmentary vertical cross section taken along the line 2—2 of Figure 1 looking in the direction of the arrows.

Figure 3 is an enlarged fragmentary view similar to Figure 2 illustrating the invention in closed position.

Figure 4 is an enlarged fragmentary horizontal cross section taken along the line 4—4 of Figure 2 looking in the direction of the arrows.

Figure 5 is an enlarged fragmentary transverse cross section taken along the line 5—5 of Figure 2 looking in the direction of the arrows.

Figure 6 is a perspective view of a modified form of the invention.

Figure 7 is an enlarged fragmentary vertical cross section taken along the line 7—7 of Figure 6 looking in the direction of the arrows.

Figure 8 is an enlarged fragmentary transverse cross section taken along the line 8—8 of Figure 7 looking in the direction of the arrows.

Figure 9 is an enlarged fragmentary transverse cross section taken along the line 9—9 of Figure 7 looking in the direction of the arrows.

Figure 10 is an enlarged fragmentary transverse cross section taken along the line 10—10 of Figure 7 looking in the direction of the arrows.

Figure 11 is an enlarged fragmentary horizontal cross section taken along the line 11—11 of Figure 6 looking in the direction of the arrows.

Referring now to the drawings in detail and in particular to Figures 1 through 5, the reference numeral 20 indicates generally a combined awning shutter constructed in accordance with the invention.

The combined awning shutter 20 includes an elongated generally rectangular flat metallic panel 21 having an outwardly extending perpendicular flange 22 formed on its upper edge. The lower edge of the panel 21 is formed into a hollow roll 23 arranged to extend oppositely of the flange 22. The opposite side edges of the panel 21 are provided with upstanding flanges 24 extending perpendicularly to the panel 21, in the same direction as the flange 22.

A side plate 25 is reverted at 26 along one edge thereof to engage over the flange 24 and is provided with a perpendicularly extending flange 27 along the opposite side edge thereof. Fastening elements 28 extend through the reverted portion 26 of the side plate 25 and through the flange 24 to detachably secure the side plate 25 to the panel 21.

The side plate 25 tapers from its lower end 29 towards its upper end 30. The upper end 30 extends slightly beyond the flange 22 and is notched so that when the shutter 20 is lowered as in Figure 4, its edge will lie flat against frame 32 and clear bracket 31.

A bracket 31 is detachably secured to a window frame 32 in horizontal position at the upper edge thereof. The bracket 31 is provided with outwardly extending parallel ears 33 arranged at the opposite ends thereof. The bracket 31 has a central portion 34 bowed outwardly from the window frame 32 as can be seen in Figure 4.

The side plates 25 have their upper end portions 30 secured to the ears 33 by means of pivot bolts 35.

A brace generally indicated at 36 includes a link 37 pivotally secured at 38 to the side plate 25 and a second link 39 pivotally secured at 40 to a bracket 41 secured to the window frame 32. The links 37, 39 are pivoted together at 42 and are releasably locked in aligned position by a sliding sleeve 43.

A canopy generally indicated at 44 includes a generally rectangular top wall 45 having a curved front wall 46 depending perpendicularly therefrom and opposite end walls 47 integrally formed therewith. The top wall 45 is provided with a depending tongue 48 along the rear edge thereof arranged to engage between the bow 34 and the window frame 32 to secure the canopy 44 in overlying relation to the upper end of the awning shutter 20 and the bracket 31. The front wall 46 of the canopy 44 is slotted at 49 to permit the end plates 25 to extend therethrough.

The combined awning shutter 20 is held in erected position by the brace 36 with the upper end thereof sealed by the canopy 44 to provide a water tight awning. By collapsing the brace 36 the panel 21 can be lowered to a position parallel to the window frame 32. The panel 21 can be locked to the window frame 32 by any suitable means (not shown) to retain it in shutter position.

Referring now to Figures 6 through 11, a modified form of the invention is illustrated wherein a plurality of panels 21 are joined together to fit long windows.

In the modified form of the invention, a pair of panels 21 are arranged in aligned relation with their adjacent side plates 25 removed and their adjacent side flanges 24 in engagement. A tubular connector 50 is engaged in the rolled portions 23 of the adjacent panel 21 as can be seen in Figures 6, 7 and 10 to maintain the panels 21 in aligned relation.

A plurality of brackets 31 corresponding in number to the panels 21 are arranged in horizontally aligned relation. A channel shaped connector 51 engages over the flanges 24 as is shown in Figures 8 and 9. Adjacent flanges 24 are secured by bolts 52. The channel connector 51 has an arcuate end portion 53 extending around the rolled portion 23 of the panels 21. The upper end of the channel connector 51 is connected to the brackets 31 by means of pivot bolts 35 so as to hingedly support the intermediate portions of the combined panels 21. Connector channels 51 are crimped as at 51a, shown in Figure 8, to hold them in place in covering relation to the flanges 24.

A canopy 44a extends over the combined panels 21 and brackets 31 and is mounted on the brackets 31 in the same manner as is the canopy 44 illustrated in the preferred form of the invention.

The use and operation of the modifications illustrated in Figures 6 through 11 is identical to that of the preferred form of the invention and differs therefrom only in the fact that a plurality of panels 21 are connected together using connectors 50 and 51.

Having thus described the preferred embodiments of the invention, it should be understood that numerous structural modifications and adaptations may be resorted to without departing from the scope of the appended claim.

What is claimed is:

A combined awning shutter comprising an elongated rigid panel having a pair of opposed sides and opposed top and bottom ends, flanges formed integrally on and extending upwardly from each of said sides of said panel, an upwardly extending weather sealing flange formed integrally with said top end, a downwardly extending hollow roll integrally formed on said bottom end, a side plate releasably secured to each of said side flanges, each of said side plates extending perpendicularly beneath said panel, an elongated horizontal bracket adapted to be attached to the top portion of a window frame, an ear formed integrally on and extending perpendicularly outwardly from each end of said bracket, said bracket having the central portion thereof offset outwardly, bolts pivotally securing the respective upper ends of each of said side plates to a respective one of said ears, mounting said panel for swinging movement on said bracket, a canopy having a rectangular top wall, a curved front wall, opposed end walls depending perpendicularly from said top wall, and a tongue extending downwardly perpendicularly from the rear edge of said top wall, said tongue being engaged behind said central offset portion of said bracket to releasably mount said canopy in overlying rain deflecting relation to the upper end portions of said panel and said side plates, and a pivoted link brace adapted to have one of the ends thereof pivotally secured to a window frame and having the other end thereof pivotally attached to one of said side plates for holding said panel in extended relation with regard to said window frame.

References Cited in the file of this patent

UNITED STATES PATENTS

| | | |
|---|---|---|
| 695,856 | Bolles | Mar. 18, 1902 |
| 2,276,425 | Slattery | Mar. 17, 1942 |
| 2,593,221 | Thompson et al. | Apr. 15, 1952 |
| 2,629,145 | Parsson | Feb. 24, 1953 |
| 2,670,792 | Del Rio | Mar. 2, 1954 |
| 2,673,378 | Poillon | Mar. 30, 1954 |
| 2,785,445 | Phillips | Mar. 19, 1957 |
| 2,873,487 | Blanchard | Feb. 17, 1959 |